United States Patent

Hunter

[11] 4,052,779
[45] Oct. 11, 1977

[54] METHOD FOR ASSEMBLING MICRO-FILTER UNITS

[75] Inventor: H. Eric Hunter, Westwood, Calif.

[73] Assignee: Charter-Wallace, Inc., New York, N.Y.

[21] Appl. No.: 679,360

[22] Filed: Apr. 22, 1976

Related U.S. Application Data

[62] Division of Ser. No. 563,663, March 31, 1975, Pat. No. 3,973,313.

[51] Int. Cl.² .................................................. B23P 19/00
[52] U.S. Cl. .................................................. 29/429; 29/525
[58] Field of Search ......... 29/DIG. 34, 208 C, 208 E, 29/208 F, 451, 432, 525, 163.5 F; 210/445, 451; 55/503, 504, 505

[56] References Cited

U.S. PATENT DOCUMENTS

| 3,445,910 | 5/1969 | Duryee et al. | 29/163.5 F X |
| 3,503,542 | 3/1970 | Ungerer | 29/432 UX |
| 3,707,755 | 1/1973 | Pettersson | 29/DIG. 34 X |
| 3,722,697 | 3/1973 | Burke et al. | 210/451 |
| 3,807,022 | 4/1974 | Bredow | 29/208 E X |
| 3,954,625 | 5/1976 | Michalski | 210/451 X |

Primary Examiner—Charlie T. Moon
Attorney, Agent, or Firm—Gordon W. Hueschen

[57] ABSTRACT

An apparatus and a method are provided for assembling micro-filter units having a barrel, a plug adapted to be inserted in the barrel, and a filter disc clamped between the barrel and the plug, which are characterized in that the filter disc is punched out and seated in the barrel in a single stroke of a punch.

11 Claims, 4 Drawing Figures

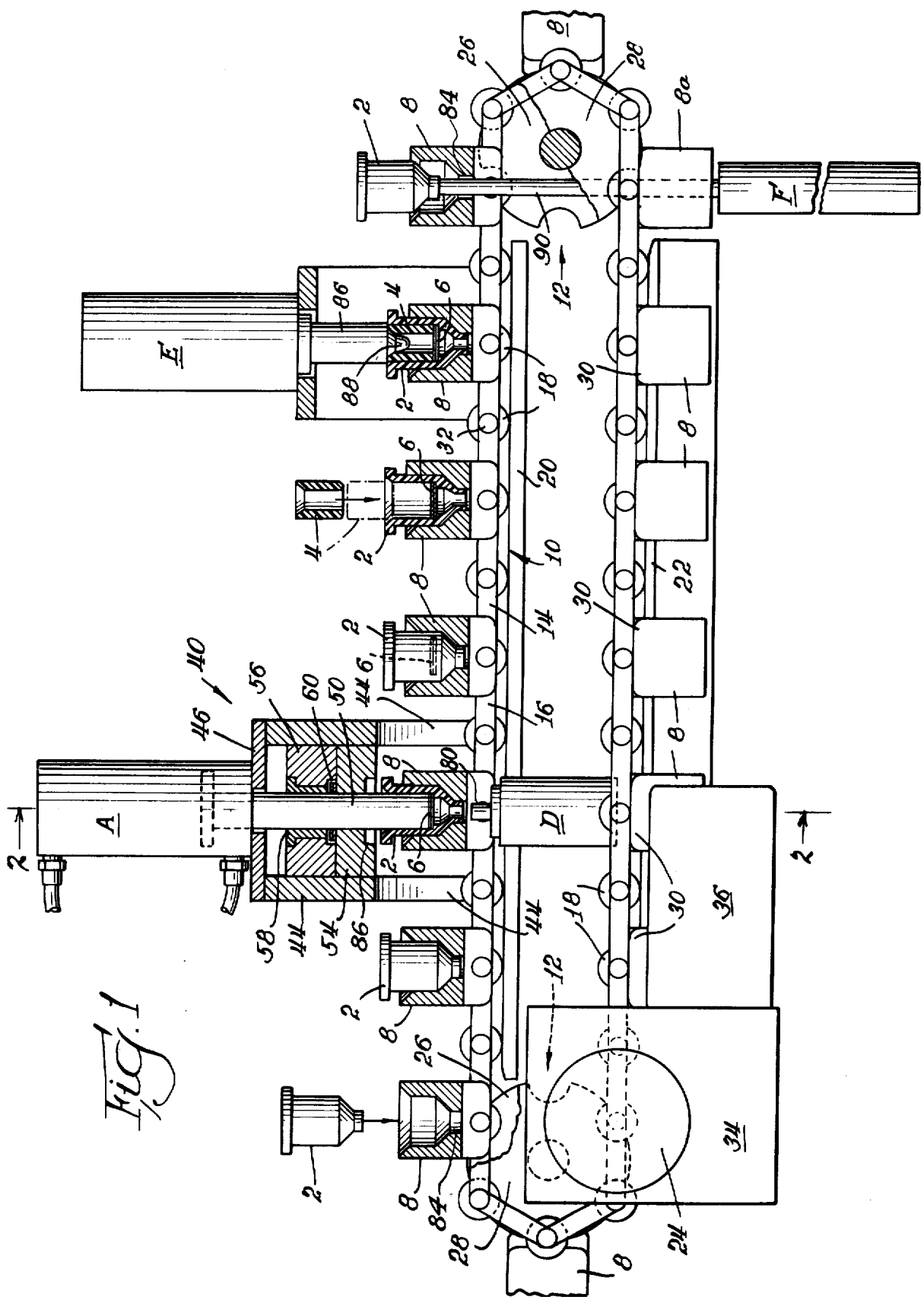

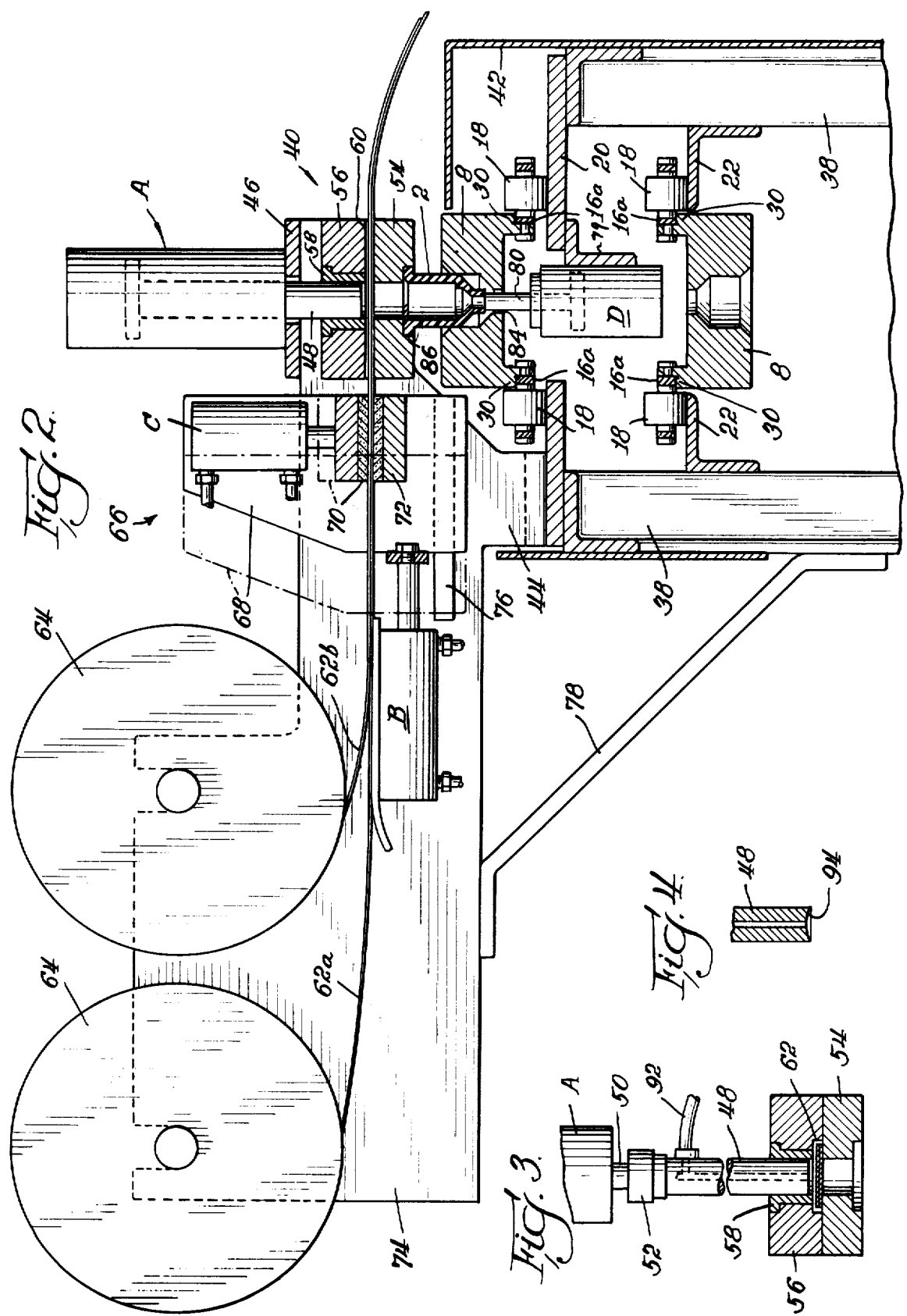

METHOD FOR ASSEMBLING MICRO-FILTER UNITS

This is a division of application Ser. No. 563,663, filed Mar. 31, 1975, now U.S. Pat. No. 3,973,313.

BACKGROUND OF THE INVENTION

1. Field of Invention

The invention relates to an apparatus and method for assembling micro-filter units. Micro-filter units are intended for the filtering of very small quantities of liquids, for example, urine, say in one or two or at most several drop quantities. One such micro-filter comprises a barrel, a plug adapted to be inserted into the barrel, and a filter disc clamped between the barrel and the plug. The invention is directed particularly to an apparatus and method for assembling such micro-filter units.

2. Prior art

Apparatus is known in the prior art for the filling and capping of bottles and for the loading of ammunition in which the container or cartridge case is advanced from station to station by a suitable indexing mechanism and the device is programmed to perform one or more operations at each station. None of these apparatuses, except for the indexing and programming mechanisms, both of which are well known and well developed in the art, are capable of being used for assembling the micro-filters with which this invention is concerned.

OBJECTS

It is an object of the invention to provide a new and improved apparatus and method for assembling micro-filter units, particularly micro-filter units having a barrel, a plug adapted to be inserted into the barrel, and a filter disc clamped between the barrel and the plug. Still more particularly it is an object of the invention to provide a simple and effective apparatus and method whereby the filter disc can be cut out of filter stock and inserted into the barrel and the plug then seated in the barrel in contact with the filter disc. Further objects will appear as the description proceeds.

SUMMARY OF THE INVENTION

The invention relates to an apparatus and a method for assembling micro-filter units having a barrel, a plug adapted to be inserted in the barrel, and a filter disc clamped between the barrel and the plug, which are characterized in that the filter disc is punched out and seated in the barrel in a single stroke of the punch. This is accomplished by providing a plurality of spaced stations, a plurality of barrel holders having the same spacing as the stations, indexing means adapted intermittently to advance the barrel holders from station to station, punch and die means located at one of said stations in apposition to the open end of the barrel which is in the barrel holder positioned at that station and with the axis of the punch coinciding with the axis of the barrel and having a reach such that after a disc is punched out, the continuation of the punching stroke carries the disc into the barrel, and means at a subsequent station for seating a plug in the barrel in contact with the filter disc.

The punching station is provided with means for advancing a web of filter stock over the die in synchronism with the operation of the punch so that, when the punch is retracted after each punching stroke, fresh stock is advanced to be ready for the next punching stroke. This is accomplished by means of a clamp, provided with means for advancing and retracting it to and from the die, programmed to clamp the filter stock and move it forward when the punch is retracted and thereafter to disengage the paper so that the clamp can be retracted for another cycle.

The punch has a reach such that, after the filter disc is punched out, a continuation of the punching stroke will carry the filter disc into the barrel and seat it there. This operation can be advantageously furthered by having a means for raising the barrel into contact with the die so that there is no space between the die and the barrel; further, by providing means to center the barrel with respect to the die so that the axis of the barrel and the axis of the die coincide. The operation can also be furthered by providing the die with a suction head so that the punched out filter disc will be held by the die until it is seated in the barrel. It is not so important with this modification to have the barrel raised into contact with the die but, of course, both may be used.

At a subsequent station, there is provided means for inserting the plug into the barrel containing the filter disc and, at a still further station, there is provided means for ejecting the assembled filter unit.

BRIEF DESCRIPTION OF THE DRAWINGS

In the drawings:

FIG. 1 is a side elevation with parts in section.

FIG. 2 is an end view in partial section taken along line 2—2 of FIG. 1.

FIG. 3 is a detailed view in partial section of a modified form of the punch and die.

FIG. 4 is a cross-section of the lower portion of the punch shown in FIG. 3.

DETAILED DESCRIPTION OF THE INVENTION

Referring now particularly to FIG. 1, 2 represents the barrel of the micro-filter unit, 4 the plug thereof, and 6 the filter disc. The barrels 2 are inserted into barrel holders 8 and advanced from station to station by continuous chain 10 arranged over sprockets 12. The first two stations are reserved for inserting the barrels in the barrel holders. The third station is the punch and die station. The fourth and fifth stations are reserved for arranging the plugs for insertion into the barrels. The sixth station is the seating station in which the plug is driven or rammed into contact with the filter disc 6 and the last station is the ejection station where the assembled micro-filter units are ejected.

The continuous chain comprises a plurality of links 14 and 16 linking together a plurality of rollers 18. The rollers roll on upper tracks 20 and lower tracks 22 as seen in FIG. 2. The rollers, after leaving the tracks, engage the sprockets whereby the chain is kept taught and is driven by suitable driving means 24 for driving one of the sprockets. The rear rollers are engaged by the rear sprockets 26 and the front rollers by the front sprockets 28 which are partially broken away so that the rear sprockets can be seen. The barrel holders 8 are provided with shoulders 30 which rest on links 14 and 16 to maintain the barrel holders in upright position as they go from station to station. Also, the pins 32 which go through the rollers 18 and link together the links 14 and 16 may be welded or otherwise affixed to the barrel holders 8 and to one of the links, i.e., to the link 16a as shown in FIG. 2, so that it is always maintained in upright position.

The housings 34 and 36 house standard indexing mechanisms and programming mechanisms for advancing the holders 8 from station to station and for performing the various operations necessary to be performed at the stations. It will be understood that the means for advancing a plurality of holders from station to station, the indexing means and the programming means for programming a sequence of operations, are all well known and understood in the art and that the invention lies in the construction and operation of the punching station as will now be more particularly described.

Referring now particularly to FIG. 2, 38 is the frame for supporting the track 20 and 22 and other devices such as the punch and die assembly 40. The frame may be enclosed in a suitable housing or covering 42.

The punch and die assembly comprises supporting arms 44 which are rigidly affixed to the frame 38. Mounted on the arms 44 is supporting plate 46 and supported on the supporting plate and affixed thereto is pressure cylinder A which may be hydraulically or pneumatically operated and which operates to advance and retract the punch 48.

As shown in the modification of FIG. 3, the piston rod may be provided with a chuck 52 for coupling the punch 48 to the piston rod 50. Supported also by the supporting arms 44 is the die 54 and the guide block 56.

The guide block 56 has an annular inset 58. The inset 58 serves as a guide for the die and may be made of porous bearing stock, babbitt, nylon or like material and may be easily replaced if worn to ensure exact alignment of the punch 50 with the die 54. In the bottom of the guide block is a transverse channel 60 for guiding filter stock over the surface of the die 54.

As shown in FIG. 2, one or more spools of filter stock may be provided depending on the thickness desired for the filter disc. The webs 62a and 62b are fed, one superposed on the other, through the channel 60 by the advancing mechanism 66. The advancing mechanism 66 comprises a frame 68 adapted to be advanced to the position shown and retracted to the position shown in the broken lines by means of the pressure cylinder B. Mounted on the frame 68 is a pressure cylinder C adapted to move a movable clamp face 70 from the position shown in the broken lines to clamp the filter stock against the fixed clamp face 72 which is affixed to the frame 68. In operation, the movable clamp face 70 is retracted, the movable frame retracted, the movable clamp face 70 advanced to clamp the filter stock against the fixed clamp face 72, and the frame then advanced to advance the filter stock in channel 60 to present fresh stock to the die.

The reels 64 are supported by a frame 74 which may be rigidly attached to the arms 44 or integral therewith. Fixed to the frame 74 is guide means 76 for guiding the frame 68 in its back and forth motion. If desired, brace 78 may be provided to give additional support and rigidity to the frame 74.

Also, at the punch and die station is provided pressure cylinder D attached to the track 20 by suitable bracket 79. The pressure cylinder D has a piston rod 80 axially aligned to go through the hole 84 in the barrel holder 8 and engage the bottom of the barrel 2 to raise it out of the barrel holder as shown in FIG. 2 and to push it up into engagement with the bottom of the die 54. The bottom of the die is recessed as shown at 86 to receive the top of the barrel and to center the barrel so that the axis of the barrel coincides with the axis of the die and with the axis of the punch.

The pressure cylinder D is operated under a hydraulic cushion. This may be accomplished by using a pneumatic fluid to operate the cylinder or by using a hydraulic fluid which is in communication with an air tank to provide the desired air cushion.

In operation, the indexing mechanism advances a barrel holder containing a barrel to the punch and die station. The pressure cylinder D is then actuated to push the barrel into contact with the die 54 and the advancing mechanism is actuated as previously described to advance the filter stock into punching position. Either of these operations may precede the other or be effected simultaneously. After the filter stock is advanced and the barrel is positioned in contact with the die, the pressure cylinder A is actuated to punch out a filter disc. The punching stroke is continued to seat the disc in the barrel and to push the barrel back into the barrel holder against the air cushion associated with pressure cylinder D. This is accomplished when the pressure in pressure cylinder A exceeds the pressure of the air cushion associated with pressure cylinder D. The pressure in cylinder D is released and then the punch withdrawn. The indexing mechanism advances another barrel holder containing a barrel to the punch and die station and the sequence is repeated.

Thereafter, the barrel containing the seated filter disc is advanced to the plug seating station. There the hydraulic cylinder E is actuated to engage the plug 4 which has been lightly seated in the barrel at the preceding station and rams it into engagement with the filter disc as shown. The piston rod or ram 86 of the cylinder E is provided with a pilot nose 88 to facilitate the driving or ramming of the plug into the barrel.

The cylinder E may be supported by suitable arms affixed to the frame as in the punch and die station.

The indexing mechanism then advances the thus assembled filter unit to the ejection station, where pressure cylinder F drives the piston rod 90 up thru the apertures in the barrel holders and ejects the assembled filter unit. A long stroke cylinder is required as the rod 90 goes up through the bottom barrel holder 8a in the ejection station. Alternatively, the sprockets 12 may be made large enough for the cylinder F to be situated between two sprockets 26 and 28. Also, in place of the pressure cylinder F, an air blast may be used to eject the assembled filter unit.

Two stations are shown before the punch and die stations and two before the seating station in order to give ample time for an operator to seat the barrel or the plug, as the case may be. If desired, suitable means such as are well known for handling bottle stoppers can be utilized for seating the barrel or the plug at these respective stations.

Referring more particularly to FIG. 3, there is shown a modification in which the punch 48 is provided with a suction head. This is simply an aperture communicating with a source of suction 92. Suction is applied when the punch 48 contacts the filter web 62 and continues until the punched out filter disc is seated in the barrel 2. In this modification the cylinder D may be omitted. If desired, the suction head may be dished out as shown in FIG. 4 at 94 so that, when the disc is held against the face of the suction head, the edges will be retracted slightly, thereby making it easier to seat it in the barrel 2.

It is to be understood that the invention is not to be limited to the exact details of operation or structure shown and described as obvious modifications and equivalents will be apparent to one skilled in the art.

I claim:

1. A process for assembling micro-filter units having a barrel, a plug adapted for insertion into said barrel, and a filter disc clamped between the barrel and the plug, which comprises seating said barrel holder, punching out the filter disc from a sheet of filter stock with a unitary punch, and seating it in the barrel in said barrel holder with a single stroke of the punch.

2. The process of claim 1 which comprises the steps of positioning the barrel in said barrel holder with its open end apposed to a punch and die with the axis of the barrel coinciding with the axis of the punch, said punch being adapted to punch out a filter disc and to seat it in said barrel, punching out said filter disc and seating it in said barrel in a single stroke of said punch, and then inserting the plug into engagement with the filter disc.

3. The process according to claim 2 in which the punched out filter disc is held against the face of the punch by a vacuum until the filter disc is seated.

4. The process according to claim 2 in which the barrel is moved partly out of said barrel holder and into engagement with the die by pneumatic pressure means.

5. A process for assembling microfilter units having a barrel, a plug adapted for insertion into said barrel, and a filter disc clamped between the barrel and the plug, which comprises the steps of positioning the barrel in a barrel holder with its open end apposed to a punch and die with the axis of the barrel coinciding with the axis of the punch, said punch being adapted to punch out a filter disc and to seat it in said barrel, punching out said filter disc and seating it in said barrel in a single stroke of said punch, and inserting the plug into engagement with the filter disc in which the barrel is moved partly out of said barrel holder and into engagement with the die by pneumatic pressure means, and in which the punch, after seating the filter disc, pushes the barrel out of engagement with the die into the barrel holder by overcoming the pneumatic pressure means.

6. The process of claim 5 in which the pneumatic pressure is released, then the punch is withdawn from the barrel, and the plug inserted thereinto.

7. A process for assembling a device comprising a barrel and a cut disc adapted to be seated in the bottom of said barrel which comprises seating said barrel in a barrel holder, moving said barrel partly out of the holder into contact with the die member of a punch and die assembly with the axis of the barrel coinciding with the axis of the punch, punching out said disk and seating it in said barrel in a single stroke of said punch and continuing the punch stroke to move said barrel back into said barrel holder.

8. The process according to claim 7 in which the barrel is held in engagement with the die by pneumatic pressure means.

9. The process according to claim 8 in which the punch, after seating the disc, pushes the barrel out of engagement with the die into the barrel holder by overcoming the pneumatic pressure means.

10. The process of claim 8, in which the pneumatic pressure means is a hydraulic cylinder.

11. The process of claim 8, in which the pneumatic pressure means is a hydraulic cylinder.

* * * * *